US012755966B2

(12) United States Patent
Wada et al.

(10) Patent No.: US 12,755,966 B2
(45) Date of Patent: Oct. 6, 2026

(54) ELECTRODE MATERIAL AND BATTERY

(71) Applicant: Panasonic Intellectual Property Management Co., Ltd., Osaka (JP)

(72) Inventors: Tomokatsu Wada, Osaka (JP); Yu Otsuka, Osaka (JP); Akihiko Sagara, Nara (JP); Shohei Kusumoto, Osaka (JP); Takanori Omae, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 485 days.

(21) Appl. No.: 18/520,643

(22) Filed: Nov. 28, 2023

(65) Prior Publication Data

US 2024/0097123 A1 Mar. 21, 2024

Related U.S. Application Data

(63) Continuation of application No. PCT/JP2022/004785, filed on Feb. 8, 2022.

(30) Foreign Application Priority Data

Jun. 11, 2021 (JP) ................................ 2021-097752

(51) Int. Cl.
*H01M 4/485* (2010.01)
*H01M 4/131* (2010.01)
(Continued)

(52) U.S. Cl.
CPC ........... *H01M 4/485* (2013.01); *H01M 4/131* (2013.01); *H01M 4/62* (2013.01);
(Continued)

(58) Field of Classification Search
CPC ........ H01M 4/485; H01M 4/131; H01M 4/62; H01M 10/0525; H01M 10/0562
See application file for complete search history.

(56) References Cited

U.S. PATENT DOCUMENTS

2013/0174370 A1 7/2013 Saruwatari et al.
2019/0081321 A1 3/2019 Oh et al.
(Continued)

FOREIGN PATENT DOCUMENTS

EP 2811551 A1 12/2014
WO 2019/146295 8/2019
WO 2020/261758 A1 12/2020

OTHER PUBLICATIONS

The EPC Office Action dated Apr. 25, 2025, for the related European Patent Application No. 22819802.4.
(Continued)

*Primary Examiner* — Sarah A. Slifka
(74) *Attorney, Agent, or Firm* — Greenblum & Bernstein, P.L.C.

(57) ABSTRACT

The electrode material according to one aspect of the present disclosure includes a first active material particle, a second active material particle, and a solid electrolyte. The first active material particle and the second active material particle each include Li, Ti, and O. The ratio of the average particle size of the second active material particle to the average particle size of the first active material particle is greater than or equal to 1.5 and less than or equal to 6.0. The battery according to one aspect of the present disclosure includes a positive electrode, a negative electrode, and an electrolyte layer located between the positive electrode and the negative electrode. At least one selected from the group consisting of the positive electrode and the negative electrode includes the electrode material.

11 Claims, 5 Drawing Sheets

(51) Int. Cl.
*H01M 4/62* (2006.01)
*H01M 10/0525* (2010.01)
*H01M 10/0562* (2010.01)

(52) U.S. Cl.
CPC ... *H01M 10/0525* (2013.01); *H01M 10/0562* (2013.01); *H01M 2300/008* (2013.01)

(56) References Cited

U.S. PATENT DOCUMENTS

| | | | |
|---|---|---|---|
| 2020/0099094 | A1 | 3/2020 | Isono et al. |
| 2020/0350562 | A1 | 11/2020 | Sugimoto et al. |
| 2022/0077493 | A1 | 3/2022 | Oshima et al. |

OTHER PUBLICATIONS

Tetsuya Asano et al: "Solid Halide Electrolytes with High Lithium-Ion Conductivity for Application in 4 V Class Bulk-Type All-Solid-State Batteries", Advanced Materials, VCH Publishers, DE, vol. 30, No. 44, Sep. 14, 2018 (Sep. 14, 2018), 7 pages, XP071872604.

International Search Report of PCT application No. PCT/JP2022/004785 dated Apr. 12, 2022.

ELECTRODE MATERIAL AND BATTERY

BACKGROUND

1. Technical Field

The present disclosure relates to an electrode material and a battery.

2. Description of the Related Art

International Publication No. WO 2019/146295 discloses a negative electrode material including a negative electrode active material that includes lithium titanate and a solid electrolyte that includes a halide and discloses an all-solid-state battery using the same.

SUMMARY

One non-limiting and exemplary embodiment provides an electrode material suitable for improving the energy density of an electrode.

Solution to Problem

In one general aspect, the techniques disclosed here feature an electrode material comprising a first active material particle, a second active material particle, and a solid electrolyte, wherein the first active material particle and the second active material particle each include Li, Ti, and O, and a ratio of an average particle size of the second active material particle to an average particle size of the first active material particle is greater than or equal to 1.5 and less than or equal to 6.0.

The present disclosure provides an electrode material suitable for improving the energy density of an electrode.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
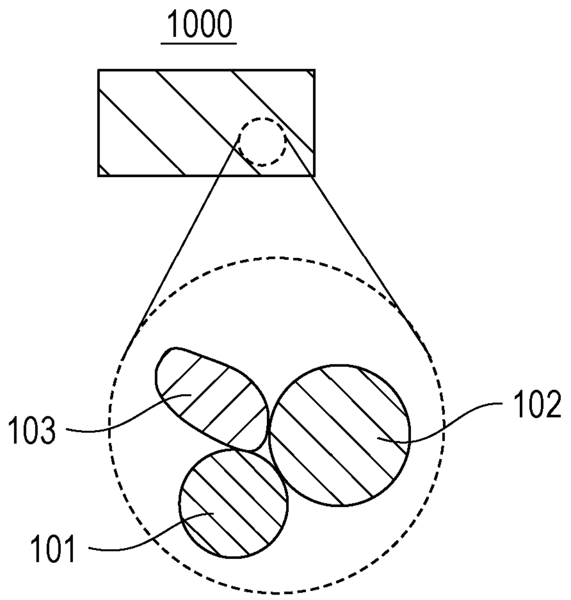
FIG. 1 is a schematic diagram of an electrode material according to an embodiment 1.

Underlying Knowledge Forming Basis of the Present Disclosure

An electrode including a known electrode material including lithium titanate as an active material tends to have a high porosity and a low energy density. As a result of intensive study, the present inventors newly found that the porosity of an electrode is decreased while maintaining the solid-phase diffusion of lithium in the active material by using two types of active material particles having different average particle sizes and that consequently the energy density of the electrode can be improved. The present inventors proceeded with further study based on the new findings and arrived at the completion of the electrode material of the present disclosure.

Overview of One Aspect of the Present Disclosure

The electrode material according to a 1st aspect of the present disclosure includes:

a first active material particle;

a second active material particle; and a solid electrolyte, wherein the first active material particle and the second active material particle each include Li, Ti, and O, and a ratio of the average particle size of the second active material particle to the average particle size of the first active material particle is greater than or equal to 1.5 and less than or equal to 6.0.

According to the 1st aspect, the ratio of the average particle sizes of the first active material particle and the second active material particle is appropriately adjusted. According to this electrode material, the porosity of the electrode tends to be reduced. In a battery using an electrode including this electrode material, the average charging voltage also tends to be high. The energy density of the electrode tends to be improved by reducing the porosity of the electrode and increasing the average charging voltage of the battery. When the ratio of the average particle size of the second active material particle to the average particle size of the first active material particle is less than 1.5 so that the average particle size of the first active material particle is almost the same as that of the second active material particle, it is difficult to reduce the porosity of the electrode. When the ratio of the average particle size of the second active material particle to the average particle size of the first active material particle is greater than 6.0, the first active material particle does not sufficiently fill between multiple individuals of the second active material particle, and it is difficult to reduce the porosity of the electrode.

In a 2nd aspect of the present disclosure, for example, in the electrode material according to the 1st aspect, the rate of the volume of the first active material particle to the total value of the volume of the first active material particle and the volume of the second active material particle may be greater than or equal to 33% and less than or equal to 83%.

In a 3rd aspect of the present disclosure, for example, in the electrode material according to the 2nd aspect, the rate may be greater than or equal to 34% and less than or equal to 66%.

According to the 2nd or 3rd aspect, the energy density of the electrode tends to be improved.

In a 4th aspect of the present disclosure, for example, in the electrode material according to any one of the 1st to 3rd aspects, the average particle size of the first active material particle may be greater than or equal to 0.5 μm and less than or equal to 1.5 μm, and the average particle size of the second active material particle may be greater than 1.5 μm and less than or equal to 4.0 μm.

According to the 4th aspect, an average particle size of the first active material particle of greater than or equal to 0.5 μm allows the active material particle to easily disperse when the electrode is produced. An average particle size of the second active material particle of less than or equal to 4.0 μm can prevent the solid-phase diffusion of lithium in the active material particle from being restricted. A battery using this electrode tends to have high charge and discharge characteristics.

In a 5th aspect of the present disclosure, for example, in the electrode material according to any one of the 1st to 4th aspects, the rate of the total value T2 of the volume of the first active material particle and the volume of the second active material particle to the total value Ti of the volume of the first active material particle, the volume of the second active material particle, and the volume of the solid electrolyte may be greater than or equal to 30% and less than or equal to 70%.

According to the 5th aspect, a rate of the total value T2 to the total value Ti of greater than or equal to 30% tends to increase the energy density of the electrode. When this rate is less than or equal to 70%, since the solid electrolyte is sufficiently present, the lithium-ion conductivity in the electrode can be sufficiently maintained. A battery using this electrode tends to have high charge and discharge characteristics.

In a 6th aspect of the present disclosure, for example, in the electrode material according to any one of the 1st to 5th aspects, the first active material particle and the second active material particle may each include lithium titanate.

In a 7th aspect of the present disclosure, for example, in the electrode material according to any one of the 1st to 6th aspects, the first active material particle and the second active material particle may each include $Li_4Ti_5O_{12}$.

In an 8th aspect of the present disclosure, for example, in the electrode material according to any one of the 1st to 7th aspects, the solid electrolyte may be represented by the following formula (1):

$$Li_{\alpha}M_{\beta}X_{\gamma} \qquad \text{formula (1)}$$

in the formula (1), α, β, and γ are each independently a value greater than 0,

M includes at least one selected from the group consisting of metal elements excluding Li and metalloid elements, and X includes at least one selected form the group consisting of F, Cl, Br, and I.

In a 9th aspect of the present disclosure, for example, in the electrode material according to any one of the 1st to 8th aspects, the solid electrolyte may include $Li_3YBr_2Cl_4$.

According to the 6th to 9th aspects, the energy density of the electrode tends to be improved.

A battery according to a 10th aspect of the present disclosure includes:

a positive electrode;

a negative electrode; and an electrolyte layer located between the positive electrode and the negative electrode, wherein at least one selected from the group consisting of the positive electrode and the negative electrode includes the electrode material according to any one of the 1st to 9th aspects.

According to the 10th aspect, the energy density of the battery tends to be improved.

In an 11th aspect of the present disclosure, for example, in the battery according to the 10th aspect, the electrolyte layer may include a solid electrolyte.

According to the 11th aspect, the battery tends to be excellent in the cycle characteristics.

Embodiments of the present disclosure will now be described with reference to the drawings.

Embodiment 1

FIG. 1 is a schematic diagram of an electrode material 1000 according to an embodiment 1. The electrode material 1000 in the embodiment 1 includes a first active material particle 101, a second active material particle 102, and a solid electrolyte 103. The first active material particle 101 and the second active material particle 102 each include Li, Ti, and O. The ratio R1 of the average particle size D2 of the second active material particle 102 to the average particle size D1 of the first active material particle 101 is greater than or equal to 1.5 and less than or equal to 6.0. In the present specification, the first active material particle 101 and the second active material particle 102 may be simply referred to as active material particles.

The average particle size D1 of the first active material particle 101 and the average particle size D2 of the second active material particle 102 can be specified by the following method. First, a cross section of the electrode material 1000 or an electrode including the electrode material 1000 is observed with a scanning electron microscope (SEM). In an obtained SEM image, for example, active material particles present in an area range of 50 μm in length and 100 μm in width are specified. The area of each of the specified active material particles is specified by image processing. Secondly, the size of a circle having an area equal to the specified area is calculated. The calculated size can be recognized as the particle size d1 of the active material particle. Furthermore, the volume of a sphere having the calculated size can be recognized as the volume V1 of the active material particle. A graph showing a volume-based particle size distribution of the active material particle is produced based on the particle size d1 and the volume V1.

Figure 2:
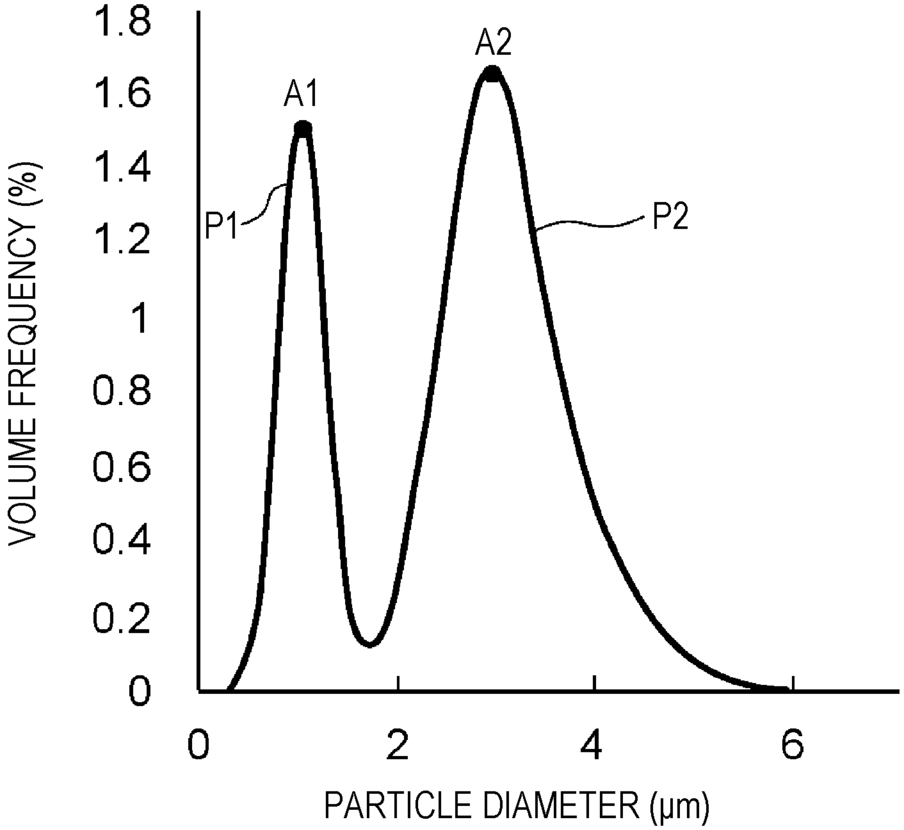
FIG. 2 is a graph showing an example of particle size distribution of an active material particle.

FIG. 2 is a graph showing an example of particle size distribution of an active material particle. As shown in FIG. 2, in the present embodiment, the particle size distribution of the active material particle tends to have two peaks P1 and P2. In FIG. 2, the particle sizes of the active material particles constituting peak P1 are smaller than those of the active material particles constituting the peak P2. In the present embodiment, the active material particles constituting the peak P1 can be recognized as the first active material particle 101. The active material particles constituting the peak P2 can be recognized as the second active material particle 102. Furthermore, the particle size corresponding to the vertex A1 of the peak P1 can be recognized as the average particle size D1 of the first active material particle 101. The particle size corresponding to the vertex A2 of the peak P2 can be recognized as the average particle size D2 of the second active material particle 102. For example, it can be specified from FIG. 2 that the average particle size D1 of the first active material particle 101 is 1 μm and that the average particle size D2 of the second active material particle 102 is 3 μm.

The ratio R1 of the average particle size D2 of the second active material particle 102 to the average particle size D1 of the first active material particle 101 is less than or equal to 6.0 and may be less than or equal to 5.0, less than or equal to 4.0, or less than or equal to 3.5. The ratio R1 is greater than or equal to 1.5 and may be greater than or equal to 2.5. As an example, the ratio R1 may be greater than or equal to 2.5 and less than or equal to 3.5.

The average particle size D1 of the first active material particle 101 is not particularly limited and is, for example, greater than or equal to 0.5 μm and less than or equal to 1.5 μm. An average particle size D1 of greater than or equal to 0.5 μm allows the active material particle to easily disperse when an electrode is produced. A battery using this electrode tends to have high charge and discharge characteristics.

The average particle size D2 of the second active material particle 102 is, for example, greater than 1.5 μm and may be greater than or equal to 2.0 μm. The upper limit of the average particle size D2 is not particularly limited and is, for example, 9.0 μm and may be 6.0 μm or 4.0 μm. As an example, the average particle size D2 is greater than 1.5 μm and may be less than or equal to 4.0 μm. When the average particle size D2 is less than or equal to 4.0 μm, the solid-phase diffusion of lithium in the active material particle can be prevented from being restricted. In a battery using this electrode material 1000, the charge and discharge characteristics tend to be high.

The rate R2 of the volume V1 of the first active material particle 101 to the total value T2 of the volume V1 of the first active material particle 101 and the volume V2 of the second active material particle 102 is not particularly limited and is, for example, greater than or equal to 10% and may be greater than or equal to 20%, greater than or equal to 30%, greater than or equal to 33%, greater than or equal to 34%, or greater than or equal to 40%. The rate R2 may be less than or equal to 90%, less than or equal to 83%, less than or equal to 70%, less than or equal to 66%, or less than or equal to 60%. As an example, the rate R2 may be greater than or equal to 33% and less than or equal to 83% or greater than or equal to 34% and less than or equal to 66%.

The volumes V1 and V2 for calculating the rate R2 can be specified from the first active material particle 101 and the second active material particle 102 that are used as raw materials for producing the electrode material 1000.

The shape of the first active material particle 101 and the shape of the second active material particle 102 are not particularly limited and may be, for example, acicular, spherical, oval spherical, or fibrous.

The composition of the first active material particle 101 and the composition of the second active material particle 102 are not particularly limited as long as Li, Ti, and O are included. The first active material particle 101 and the second active material particle 102 may each include a lithium titanium oxide, in particular, lithium titanate. The first active material particle 101 and the second active material particle 102 may each include at least one selected from the group consisting of $Li_4Ti_5O_{12}$, $Li_7Ti_5O_{12}$, and $LiTi_2O_4$ or may include $Li_4Ti_5O_{12}$. The composition of the first active material particle 101 may be the same as or different from that of the second active material particle 102.

The compositions of the first active material particle 101 and the second active material particle 102 are not limited to the above. These active material particles may further include M1. M1 is at least one selected from the group consisting of metal elements excluding Li and Ti and metalloid elements.

In the present disclosure, the "metal elements" are (i) all elements in Groups 1 to 12 of the Periodic Table excluding hydrogen and (ii) all elements in Groups 13 to 16 of the Periodic Table excluding B, Si, Ge, As, Sb, Te, C, N, P, O, S, and Se. That is, the metal elements are a group of elements that can become cations when inorganic compounds are formed with halogen compounds.

In the present disclosure, the "metalloid elements" are B, Si, Ge, As, Sb, and Te.

The active material particle may include Zr (i.e., zirconium) as M1. The active material particle may be represented by the following formula (2):

$$Li_4Ti_{5-\alpha}Zr_\alpha O_{12} \quad \text{formula (2).}$$

Here, α satisfies $0<\alpha\leq0.3$.

In the formula (2), a may satisfy $0<\alpha\leq0.2$ or may satisfy $0.01\leq\alpha\leq0.1$.

The active material particle including Zr may include, for example, a compound represented by a formula of $Li_{a1}T_{b1}Zr_{c1}Me1_{d1}O_{e1}$. Here, a1+4b1+4c1+md1=2e1 and c1>0 are satisfied; Me1 is at least one selected from the group consisting of metal elements excluding Li and Y and metalloid elements; and m is the valence of Me1. As the Me1, at least one selected from the group consisting of Mg, Ca, Sr, Ba, Zn, Sc, Al, Ga, Bi, Hf, Sn, Ta, and Nb may be used.

In the present embodiment, the solid electrolyte 103 has, for example, lithium-ion conductivity. The solid electrolyte 103 may include a halide solid electrolyte. In the present disclosure, the term "halide solid electrolyte" means a solid electrolyte including a halogen element and not including sulfur. In the present disclosure, the solid electrolyte not including sulfur means a solid electrolyte represented by a formula not including a sulfur element. Accordingly, a solid electrolyte including a very small amount of sulfur, for example, less than or equal to 0.1 mass % of sulfur, is encompassed in a solid electrolyte not including sulfur. The halide solid electrolyte may further include oxygen as an anion other than halogen elements.

The solid electrolyte 103 includes, for example, Li, M, and X, where M includes at least one selected from the group consisting of metal elements excluding Li and metalloid elements; and X includes at least one selected from the group consisting of F, Cl, Br, and I.

The solid electrolyte 103 may consist essentially of Li, M, and X. The fact that "the solid electrolyte 103 consists essentially of Li, M, and X" means that, in the solid electrolyte 103, the proportion (molar fraction) of the total amount of Li, M, and X to the total amount of all elements constituting the solid electrolyte 103 is greater than or equal to 90%. As an example, the proportion may be greater than or equal to 95%. The solid electrolyte 103 may consist of Li, M, and X only.

In order to enhance the ion conductivity, M may include at least one element selected from the group consisting of Group 1 elements, Group 2 elements, Group 3 elements, Group 4 elements, and lanthanoid elements. M may include at least one element selected from the group consisting of Group 5 elements, Group 12 elements, Group 13 elements, and Group 14 elements.

Examples of the Group 1 element include Na, K, Rb, and Cs. Examples of the Group 2 element include Mg, Ca, Sr, and Ba. Examples of the Group 3 element include Sc and Y. Examples of the Group 4 element include Ti, Zr, and Hf. Examples of the lanthanoid element include La, Ce, Pr, Nd, Sm, Eu, Gd, Tb, Dy, Ho, Er, Tm, Yb, and Lu. Examples of the Group 5 element include Nb and Ta. Examples of the Group 12 element include Zn. Examples of the Group 13 element include Al, Ga, and In. Examples of the Group 14 element include Sn.

In order to further enhance the ion conductivity, M may include at least one element selected from the group consisting of Na, K, Mg, Ca, Sr, Ba, Sc, Y, Zr, Hf, La, Ce, Pr, Nd, Sm, Eu, Gd, Tb, Dy, Ho, Er, Tm, Yb, and Lu.

In order to further enhance the ion conductivity, M may include at least one element selected from the group consisting of Mg, Ca, Sr, Y, Sm, Gd, Dy, and Hf. M may include Y.

In order to further enhance the ion conductivity, X may include at least one element selected from the group consisting of Br, Cl, and I.

In order to further enhance the ion conductivity, X may include Br, Cl, and I.

The solid electrolyte 103 may be represented by the following formula (1):

$$Li_{\alpha}M_{\beta}X_{\beta} \quad \text{formula (1).}$$

In formula (1), α, β, and γ are each independently a value greater than 0.

For example, when M includes Y, in the formula (1) above, the following mathematical expressions:

$$2.5 \le \alpha \le 3.5;$$

$$0.5 \le \beta \le 1.5; \text{ and}$$

$$\gamma = 6$$

may be satisfied.

The solid electrolyte 103 may include $Li_3YX_6$.

The solid electrolyte 103 may include $Li_3YBr_6$ or $Li_3YBr_xCl_yI_{6-x-y}$. Here, x and y satisfy 0<x<6, 0<y<6, and 0<x+y<6.

The solid electrolyte 103 may include at least one selected from the group consisting of $Li_3YBr_6$, $Li_3YBr_2Cl_4$, and $Li_3YBr_2Cl_2I_2$ and may include $Li_3YBr_2Cl_4$. The solid electrolyte 103 may be $Li_3YBr_2Cl_4$.

The shape of the solid electrolyte 103 is not limited. The shape of the solid electrolyte 103 may be, for example, acicular, spherical, oval spherical, or fibrous. The solid electrolyte 103 may be particulate.

When the solid electrolyte 103 is particulate, the average particle size D3 of the solid electrolyte 103 may be smaller than the average particle size D1 of the first active material particle 101 and the average particle size D2 of the second active material particle 102. In this case, since the number of the particles of the solid electrolyte 103 that are in contact with the active material particles is sufficiently large, the lithium-ion conductivity in the electrode material 1000 is prevented from being reduced. In a battery using this electrode material 1000, the charge and discharge characteristics are prevented from being deteriorated. As an example, the average particle size D3 of the solid electrolyte 103 may be less than or equal to 1.5 μm.

The average particle size D3 of the solid electrolyte 103 can be specified by the following method. First, a cross section of the electrode material 1000 or an electrode including the electrode material 1000 is observed with an SEM. In an obtained SEM image, for example, particles of the solid electrolyte 103 present in the area range of 50 μm in length and 100 μm in width are specified. The area of each of the specified particles of the solid electrolyte 103 is specified by image processing. Secondly, the size of a circle having an area equal to the specified area is calculated. The calculated size can be recognized as the particle size d2 of the solid electrolyte 103. Furthermore, the volume of a sphere having the calculated size can be recognized as the volume V2 of the solid electrolyte 103. A graph showing a particle size distribution of the solid electrolyte 103 is produced based on the particle size d2 and the volume V2.

The particle size distribution of the solid electrolyte 103 tends to have one peak. The particle size corresponding to the vertex of this peak can be recognized as the average particle size D3 of the solid electrolyte 103.

In the present embodiment, the rate R3 of the total value T2 of the volume V1 of the first active material particle 101 and the volume V2 of the second active material particle 102 to the total value T1 of the volume V1 of the first active material particle 101, the volume V2 of the second active material particle 102, and the volume V3 of the solid electrolyte 103 is not particularly limited and is, for example, greater than or equal to 30% and less than or equal to 70%. When the rate R3 is greater than or equal to 30%, the energy density of the electrode tends to be high. When the rate R3 is less than or equal to 70%, since the solid electrolyte 103 is sufficiently present, the lithium-ion conductivity in the electrode can be sufficiently maintained. A battery using this electrode tends to have high charge and discharge characteristics.

The volumes V1, V2, and V3 for calculating the rate R3 can be specified from the first active material particle 101, the second active material particle 102, and the solid electrolyte 103 that are used as raw materials for producing the electrode material 1000.

In the electrode material 1000 in the embodiment 1, the solid electrolyte 103, the first active material particle 101, and the second active material particle 102 may be in contact with each other as shown in FIG. 1.

A method for manufacturing the solid electrolyte 103 will then be described. The solid electrolyte 103 is manufactured by, for example, the following method.

First, raw material powders are provided so as to give the compounding ratio of a target composition. The raw material powders may be, for example, halides. For example, when $Li_3Br_2Cl_4$ is produced, LiBr, LiCl, and $YCl_3$ are provided at a molar ratio of LiBr:LiCl:$YCl_3$ of 2.0:1.0:1.0. The raw material powders may be mixed at a molar ratio adjusted in advance such that a composition change which may occur during the synthesis process is offset.

The types of the raw material powders are not limited to the above. For example, a combination of LiCl and $YBr_3$ and a complex anion compound such as $LiBr_{0.5}Cl_{0.5}$ may be used. A mixture of a raw material powder containing oxygen and a halide may be used. Examples of the raw material powder containing oxygen include an oxide, a hydroxide, a sulfate, and a nitrate. Examples of the halide include ammonium halide.

The raw material powders are thoroughly mixed using a mortar and a pestle, a ball mill, or a mixer to obtain a powder mixture. Subsequently, the raw material powders are pulverized by a mechanochemical milling method. Thus, the raw material powders react to give a solid electrolyte 103. Alternatively, the solid electrolyte 103 may be obtained by thoroughly mixing the raw material powders and then heat-treating the powder mixture in vacuum or in an inert atmosphere. The heat treatment may be performed, for example, in a range of greater than or equal to 100° C. and less than or equal to 650° C. for more than 1 hour.

Consequently, a solid electrolyte 103 including a crystal phase is obtained.

The structure of the crystal phase (i.e., crystal structure) in the solid electrolyte 103 can be determined by selecting the reaction method between raw material powders and the reaction conditions.

The electrode material 1000 may include a binder for the purpose of improving the adhesion between individual particles. The binder is used for improving the binding property of the materials that constitute the electrode material 1000.

Examples of the binder are polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber, and carboxymethyl cellulose. Furthermore, as the binder, a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene can be used. These binders may be used alone or in combination of two or more thereof.

An elastomer may be used as the binder. The elastomer means a polymer having elasticity. The elastomer that is used as the binder may be a thermoplastic elastomer or a thermosetting elastomer. The binder may include a thermoplastic elastomer. Examples of the elastomer include a styrene-ethylene/butylene-styrene block copolymer (SEBS), a styrene-ethylene/propylene-styrene block copolymer (SEPS), a styrene-ethylene/ethylene/propylene-styrene block copolymer (SEEPS), butylene rubber (BR), isoprene rubber (IR), chloroprene rubber (CR), acrylonitrile-butadiene rubber (NBR), styrene-butylene rubber (SBR), a styrene-butadiene-styrene block copolymer (SBS), a styrene-isoprene-styrene block copolymer (SIS), hydrogenated isoprene rubber (HIR), hydrogenated butyl rubber (HIIR), hydrogenated nitrile rubber (HNBR), and hydrogenated styrene-butylene rubber (HSBR). As the binder, a mixture of two or more selected from these elastomers may be used.

The electrode material 1000 may include a conductive assistant for the purpose of enhancing the electron conductivity. The conductive assistants that can be used are, for example, (i) graphite, such as natural graphite and artificial graphite;
(ii) carbon black, such as acetylene black and Ketjen black;
(iii) conductive fibers, such as a carbon fiber and a metal fiber;
(iv) carbon fluoride;
(v) metal powders, such as aluminum;
(vi) conductive whiskers, such as zinc oxide and potassium titanate;
(vii) conductive metal oxides, such as titanium oxide; and
(viii) conductive polymeric compounds, such as polyanion, polypyrrole, and polythiophene.

When a carbon conductive assistant is used, the cost can be reduced.

Embodiment 2

An embodiment 2 will now be described. The description overlapping that in the above-described embodiment 1 is omitted as appropriate.

Figure 3:
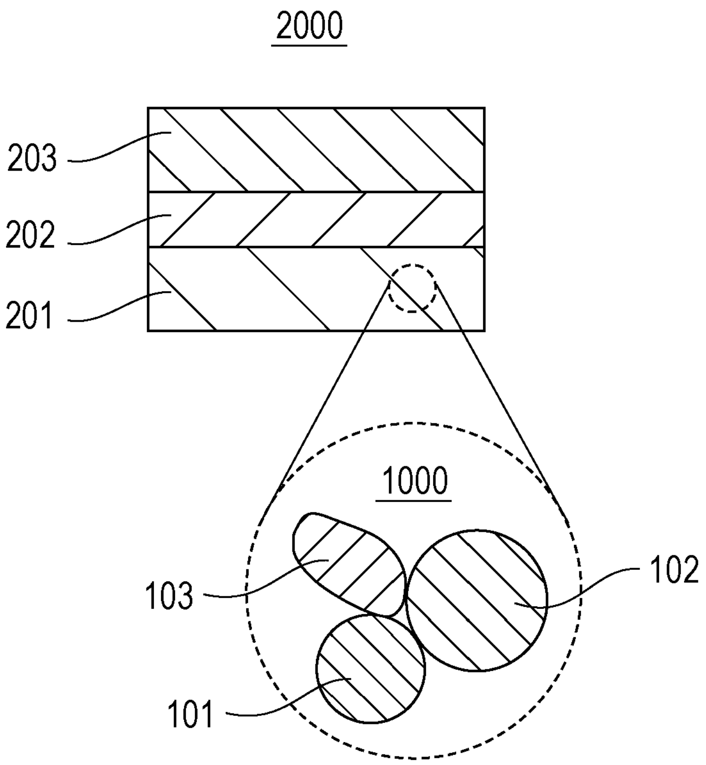
FIG. 3 is a cross-sectional view of a battery according to an embodiment 2.

FIG. 3 is a cross-sectional view of a battery 2000 according to an embodiment 2.

The battery 2000 in embodiment 2 includes a positive electrode 203, a negative electrode 201, and an electrolyte layer 202. The electrolyte layer 202 is located between the positive electrode 203 and the negative electrode 201. At least one selected from the group consisting of the positive electrode 203 and the negative electrode 201 includes the electrode material 1000 in the embodiment 1 above.

As shown in FIG. 3, in the battery 2000 in the embodiment 2, the negative electrode 201 may include the electrode material 1000 in the embodiment 1 above.

Hereinafter, a battery 2000 in which the negative electrode 201 includes the electrode material 1000 will be described. However, the battery 2000 of embodiment 2 is not limited to the following configuration. In the battery 2000, the positive electrode 203 may include the electrode material 1000 in the embodiment 1 above.

The negative electrode 201 is, for example, layered. As an example, the negative electrode 201 is a single layer. The thickness of the negative electrode 201 may be greater than or equal to 10 μm and less than or equal to 500 μm. When the thickness of the negative electrode 201 is greater than or equal to 10 μm, the energy density of the battery 2000 can be sufficiently secured. When the thickness of the negative electrode 201 is less than or equal to 500 μm, the battery 2000 can operate at high output.

In the negative electrode 201, there is a tendency that the gaps formed between multiple particles of the second active material particle 102 are filled with the first active material particle 101 that has a small average particle size. That is, the porosity of the negative electrode 201 tends to be reduced by the first active material particle 101 and the second active material particle 102 that have appropriately adjusted average particle sizes. The porosity of the negative electrode 201 is not particularly limited and is, for example, less than or equal to 15% and may be less than or equal to 14%, less than or equal to 13%, or less than or equal to 11%. The lower limit of the porosity of the negative electrode 201 is not particularly limited and is, for example, 1%. The porosity of the negative electrode 201 can be calculated from the volume of the negative electrode 201 and the true density of the material of the negative electrode 201.

The electrolyte layer 202 is a layer containing an electrolyte material. Examples of the electrolyte material include a solid electrolyte. That is, the electrolyte layer 202 may be a solid electrolyte layer containing a solid electrolyte. The electrolyte layer 202 may be constituted of a solid electrolyte.

Examples of the solid electrolyte contained in the electrolyte layer 202 include a halide solid electrolyte, a sulfide solid electrolyte, an oxide solid electrolyte, a polymer solid electrolyte, and a complex hydride solid electrolyte.

As the halide solid electrolyte, for example, the materials exemplified as the above-described solid electrolyte 103 may be used.

As the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$ can be used. LiX, $Li_2O$, $MO_q$, $Li_pMO_q$, or the like may be added to these electrolytes. The element X in "LiX" is at least one selected from the group consisting of F, Cl, Br, and I; the element M in "$MO_q$" and "$Li_pMO_q$" is at least one selected from the group consisting of P, Si, Ge, B, Al, Ga, In, Fe, and Zn; and p and q in "$MO_q$" and "$Li_pMO_q$" are each independently a natural number.

The oxide solid electrolytes that can be used are, for example, (i) NASICON-type solid electrolytes represented by $LiTi_2(PO_4)_3$ and element substitutes thereof;
(ii) $(LaLi)TiO_3$-based perovskite-type solid electrolytes;
(iii) LISICON-type solid electrolytes represented by $Li_{14}ZnGe_4O_{16}$, $Li_4SiO_4$, $LiGeO_4$, and element substitutes thereof;

(iv) garnet-type solid electrolytes represented by $Li_7La_3Zr_2O_{12}$ and element substitutes thereof;
(v) $Li_3N$ and H-substitutes thereof;
(vi) $Li_3PO_4$ and N-substitutes thereof; and
(vii) glass or glass ceramics in which an Li—B—O compound as a base material, such as $LiBO_2$ or $Li_3BO_3$, is doped with $Li_2SO_4$, $Li_2CO_3$, or the like.

As the polymer solid electrolyte, for example, a compound of a polymeric compound and a lithium salt can be used. The polymeric compound may have an ethylene oxide structure. A polymer electrolyte having an ethylene oxide structure can contain a large amount of a lithium salt. Accordingly, it is possible to more enhance the ion conductivity. As the lithium salt, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$ can be used. One lithium salt selected from these salts may be used alone, or a mixture of two or more lithium salts selected from these salts may be used.

As the complex hydride solid electrolyte, for example, $LiBH_4$—LiI or $LiBH_4$—$P_2S_5$ can be used.

The electrolyte layer 202 may contain a solid electrolyte as a main component. That is, the electrolyte layer 202 may contain the solid electrolyte at a mass proportion of greater than or equal to 50% (greater than or equal to 50 mass %) with respect to the total amount of the electrolyte layer 202.

The electrolyte layer 202 may contain the solid electrolyte at a mass proportion of greater than or equal to 70% (greater than or equal to 70 mass %) with respect to the total amount of the electrolyte layer 202.

The electrolyte layer 202 may further contain inevitable impurities. The electrolyte layer 202 may contain the starting materials that have been used for synthesis of the solid electrolyte. The electrolyte layer 202 may contain by-products or decomposition products generated when the solid electrolyte is synthesized.

In the electrolyte layer 202, the mass ratio of the solid electrolyte to the electrolyte layer 202 can be substantially 1. The fact that "the mass ratio is substantially 1" means that the above-mentioned mass ratio calculated without considering inevitable impurities contained in the electrolyte layer 202 is 1. That is, the electrolyte layer 202 may be constituted of the solid electrolyte only.

The electrolyte layer 202 may contain two or more of the materials mentioned as the solid electrolyte.

The electrolyte layer 202 may have a thickness of greater than or equal to 1 μm and less than or equal to 300 μm.

When the thickness of the electrolyte layer 202 is greater than or equal to 1 μm, the risk of short circuit between the positive electrode 203 and the negative electrode 201 is reduced. When the thickness of the electrolyte layer 202 is less than or equal to 300 μm, the battery 2000 can easily operate at high output.

The positive electrode 203 includes a material that has a property of occluding and releasing metal ions (for example, lithium ions). The positive electrode 203 may include, for example, a positive electrode active material.

Examples of the positive electrode active material include:
(i) a lithium-containing transition metal oxide, such as $Li(NiCoAl)O_2$, $Li(NiCoMn)O_2$, and $LiCoO_2$;
(ii) a transition metal fluoride;
(iii) a polyanionic material;
(iv) a fluorinated polyanionic material;
(v) a transition metal sulfide;
(vi) a transition metal oxysulfide; and
(vii) a transition metal oxynitride.

In particular, when a lithium-containing transition metal oxide is used as the positive electrode active material, the manufacturing cost of the battery 2000 can be reduced, and the average discharge voltage of the battery 2000 can be increased.

The positive electrode 203 may include a solid electrolyte. According to the above configuration, the lithium-ion conductivity inside the positive electrode 203 is enhanced, and operation at high output is possible.

Examples of the solid electrolyte included in the positive electrode 203 include a halide solid electrolyte, a sulfide solid electrolyte, an oxide solid electrolyte, a polymer solid electrolyte, and a complex hydride solid electrolyte. As the halide solid electrolyte, for example, the materials exemplified as the above-described solid electrolyte 103 may be used. As the sulfide solid electrolyte, the oxide solid electrolyte, the polymer solid electrolyte, and the complex hydride solid electrolyte, for example, the materials exemplified as the solid electrolytes contained in the electrolyte layer 202 above may be used.

The shape of the positive electrode active material may be particulate. The average particle size of the positive electrode active material particle may be greater than or equal to 0.1 μm and less than or equal to 100 μm. When the average particle size of the positive electrode active material particle is greater than or equal to 0.1 μm, the positive electrode active material and the solid electrolyte can form a good dispersion state in the positive electrode 203. Consequently, the charge and discharge characteristics of the battery 2000 can be improved. When the average particle size of the positive electrode active material particle is less than or equal to 100 μm, the lithium diffusion speed in the positive electrode active material is improved. Consequently, the battery 2000 can operate at high output.

The shape of the solid electrolyte included in the positive electrode 203 may be particulate. In the positive electrode 203, the average particle size of the positive electrode active material particle may be larger than that of the solid electrolyte particle. Consequently, a good dispersion state of the positive electrode active material particle and the solid electrolyte particle can be formed.

In the positive electrode 203, the volume ratio Vp of the volume of the positive electrode active material particle to the total volume of the positive electrode active material particle and the solid electrolyte particle may be greater than or equal to 0.3 and less than or equal to 0.95. When the volume ratio Vp is greater than or equal to 0.3, the energy density of the battery 2000 can be sufficiently secured. When the volume ratio Vp is less than or equal to 0.95, the battery 2000 can operate at high output.

The positive electrode 203 is, for example, layered. The thickness of the positive electrode 203 may be greater than or equal to 10 μm and less than or equal to 500 μm. When the thickness of the positive electrode 203 is greater than or equal to 10 μm, the energy density of the battery 2000 can be sufficiently secured. When the thickness of the positive electrode 203 is less than or equal to 500 μm, the battery 2000 can operate at high output.

The positive electrode active material may be coated by a coating material. As the coating material, a material having low electron conductivity can be used. As the coating material, an oxide material, an oxide solid electrolyte, or the like can be used.

As the oxide material, for example, $SiO_2$, $Al_2O_3$, $TiO_2$, $B_2O_3$, $Nb_2O_5$, $WO_3$, and $ZrO_2$ can be used.

The oxide solid electrolytes that can be used are, for example, (i) Li—Nb—O compounds such as $LiNbO_3$;
(ii) Li—B—O compounds such as $LiBO_2$ and $Li_3BO_3$;
(iii) Li—Al—O compounds such as $LiAlO_2$;
(iv) Li—Si—O compounds such as $Li_4SiO_4$;
(v) Li—S—O compounds such as $Li_2SO_4$;
(vi) Li—Ti—O compounds such as $Li_4Ti_5O_{12}$;
(vii) Li—Zr—O compounds such as $Li_2ZrO_3$;
(viii) Li—Mo—O compounds such as $Li_2MoO_3$;
(ix) Li-V-O compounds such as $LiV_2O_5$; and
(x) Li—W—O compounds such as $Li_2WO_4$.

Oxide solid electrolytes have high ion conductivity and high high-potential stability. Accordingly, the charge and discharge efficiency can be more improved by using an oxide solid electrolyte as the coating material.

At least one selected from the group consisting of the positive electrode 203 and the electrolyte layer 202 may include a binder for the purpose of improving the adhesion between individual particles. As the binder, for example, those described above for the electrode material 1000 may be used.

The positive electrode 203 may include a conductive assistant for the purpose of enhancing the electron conductivity. As the conductive assistant, for example, those described above for the electrode material 1000 may be used.

Examples of the shape of the battery 2000 include a coin type, a cylindrical type, a square type, a sheet type, a button type, a flat type, and a stacked type.

EXAMPLES

The details of the present disclosure will now be described using Examples and Comparative Examples. The electrode material and battery of the present disclosure are not limited to the following Examples.

Example 1

Production of Solid Electrolyte

Raw material powders: LiBr, $YBr_3$, LiCl, and $YCl_3$ were weighed at a molar ratio of Li:Y:Br:Cl=3:1:2:4 in a dry argon atmosphere. These powders were pulverized and mixed in a mortar. Subsequently, the mixture was subjected to milling treatment using a planetary ball mill at 600 rpm for 25 hours. Consequently, a powder of $Li_3YBr_2Cl_4$ as a solid electrolyte was obtained.

Evaluation of Composition of Solid Electrolyte

The produced solid electrolyte was evaluated for the composition by inductive coupled plasma (ICP) emission spectral analysis. As a result, the ratio Li/Y deviated from the charged composition within 3%. That is, it can be said that the composition charged in the planetary ball mill and the composition of the obtained solid electrolyte were almost the same.

Production of First Active Material Particle and Second Active Material Particle A first active material particle and a second active material particle were produced by classifying an active material particle (manufactured by Toshima Manufacturing Co., Ltd.) made of $Li_4Ti_5O_{12}$. The classification was performed using a classifier (SATAKE i Classifier, manufactured by SATAKE MultiMix Corporation). The first active material particle had a D50 of 1 μm. The second active material particle had a D50 of 3 μm. The D50 of the active material particles was measured using a particle size analyzer (Multisizer 4e, manufactured by Beckman Coulter Inc.). The D50 means the particle size at which the cumulative volume in the volume-based particle size distribution determined by a laser diffraction/scattering method is equal to 50%.

Production of Electrode

Subsequently, the first active material particle and the second active material particle were weighed such that the rate R2 of the volume of the first active material particle to the total value of the volume of the first active material particle and the volume of the second active material particle was 50%. The total mass of the first active material particle and the second active material particle was 5 g. Subsequently, 1.2 g of a para-chlorotoluene solution containing a styrene-ethylene/butylene-styrene block copolymer (SEBS) (manufactured by Asahi Kasei Corporation, Tuftec (registered trademark)) at a concentration of 6 mass % and 1 g of dibutyl ether were added to the active material particles, followed by mixing with a Thinky Mixer (ARE-310, manufactured by Thinky Corporation) under conditions of 1600 rpm for 10 minutes. To the obtained mixture, 0.14 g of a vapor grown carbon fiber (VGCF (registered trademark)) and 5.57 g of a chlorotoluene solution containing the solid electrolyte above at a concentration of 35 mass % were further added, followed by mixing with a Thinky Mixer (ARE-310, manufactured by Thinky Corporation) under conditions of 1600 rpm for 10 minutes. At this moment, the rate R3 of the total value T2 of the volumes of the active material particles to the total value T1 of the volumes of the active material particles and the volume of the solid electrolyte was 67.5%. Subsequently, the obtained mixture was subjected to distributed processing for 30 minutes using an ultrasonic disperser and further to distributed processing for 10 minutes using a homogenizer (HG-200, manufactured by AS ONE Corporation) under conditions of 3000 rpm. Subsequently, the produced slurry was coated onto Al foil using an applicator. The obtained coated layer was dried under conditions of 40° C. and then further dried under conditions of 120° C. for 40 minutes. Consequently, an electrode constituted of an electrode material was produced.

A cross-section of the obtained electrode was observed with an SEM, and the average particle size D1 of the first active material particle and the average particle size D2 of the second active material particle were specified by the above-described method. As a result, the average particle size D1 of the first active material particle was 1.012 μm, and the average particle size D2 of the second active material particle was 3.38611m. The ratio R1 of the average particle size D2 to the average particle size D1 was 3.3.

Measurement of Porosity of Electrode

A punched electrode was placed in an insulating outer cylinder and was pressed with a pressure of 360 MPa. The thickness of the electrode after the pressure treatment was measured with a micrometer. Based on the obtained results, the volume of the electrode was specified. Furthermore, based on the volume of the electrode and the true density of the material of the electrode, the porosity of the electrode was calculated. The results are shown in Table 1.

Production of Secondary Battery

In an insulating outer cylinder, 80 mg of $Li_5PS_6Cl$ and the punched electrode were stacked in this order. The obtained stack was compression molded at a pressure of 360 MPa to produce a stack composed of a negative electrode and an electrolyte layer. Subsequently, metal In (thickness: 200 μm), metal Li (thickness: 300 μm), and metal In (thickness: 200 μm) were stacked in this order on the electrolyte layer on the side opposite to the side in contact with the negative electrode. The obtained stack was compression molded at a pressure of 80 MPa to produce a stack composed of a negative electrode, an electrolyte layer, and a positive electrode. Subsequently, current collectors made of stainless steel were disposed on and under the stack, and a current collector lead was attached to each of the current collectors. Finally, the inside of the insulating outer cylinder was sealed by isolating the inside of the insulating outer cylinder from the outside atmosphere with an insulating ferrule to produce a battery of Example 1.

Charge and Discharge Test

The following charge and discharge test was performed using the battery of Example 1. First, the battery was disposed in a thermostat of 25° C. The battery was subjected to constant current charging at a current value that completes the charging in 20 hours when the theoretical capacity of $Li_4Ti_5O_{12}$ was recognized as 170 mAh/g. The charging was terminated when the potential with respect to Li reached 1.0 V.

Subsequently, the battery was discharged at a current value that completes the discharging in 20 hours when the theoretical capacity of $Li_4Ti_5O_{12}$ was recognized as 170 mAh/g. The discharging was terminated when the potential with respect to Li reached 2.5 V.

The charging capacity of the battery and the average charging voltage up to 135 mAh/g were specified based on the results of the charge and discharge test above. Furthermore, the energy density of the electrode was calculated based on the charging capacity, the average charging voltage, and the volume of the electrode. The results are shown in Table 1.

Example 2

A battery of Example 2 was produced by the same method as in Example 1 except that the electrode was produced by weighing the first active material particle and the second active material particle such that the rate R2 was 33%. The porosity and energy density of the electrode produced in Example 2 were measured by the same method as in Example 1. The results are shown in Table 1.

Example 3

A battery of Example 3 was produced by the same method as in Example 1 except that the electrode was produced by weighing the first active material particle and the second active material particle such that the rate R2 was 67%. The porosity and energy density of the electrode produced in Example 3 were measured by the same method as in Example 1. The results are shown in Table 1.

Example 4

A battery of Example 4 was produced by the same method as in Example 1 except that the electrode was produced by weighing the first active material particle and the second active material particle such that the rate R2 was 83%. The porosity and energy density of the electrode produced in Example 4 were measured by the same method as in Example 1. The results are shown in Table 1.

Comparative Example 1

A battery of Comparative Example 1 was produced by the same method as in Example 1 except that the electrode was produced without using the first active material particle. The porosity and energy density of the electrode produced in Comparative Example 1 were measured by the same method as in Example 1. The results are shown in Table 1.

Comparative Example 2

A battery of Comparative Example 2 was produced by the same method as in Example 1 except that the electrode was produced without using the second active material particle. The porosity and energy density of the electrode produced in Comparative Example 2 were measured by the same method as in Example 1. The results are shown in Table 1.

TABLE 1

| | Electrode | | | | | | | |
|---|---|---|---|---|---|---|---|---|
| | First active material particle | | Second active material particle | | | | | |
| | Composition | Average particle size (μm) | Composition | Average particle size (μm) | Rate R2 (%)(*1) | Porosity (%) | Average charging voltage (V) | Energy density (Wh/L) |
| Example 1 | $Li_4Ti_5O_{12}$ | 1.012 | $Li_4Ti_5O_{12}$ | 3.386 | 50 | 10.6 | 1.570 | 314 |
| Example 2 | $Li_4Ti_5O_{12}$ | 1.012 | $Li_4Ti_5O_{12}$ | 3.386 | 33 | 10.6 | 1.568 | 304 |
| Example 3 | $Li_4Ti_5O_{12}$ | 1.012 | $Li_4Ti_5O_{12}$ | 3.386 | 67 | 13.8 | 1.572 | 301 |
| Example 4 | $Li_4Ti_5O_{12}$ | 1.012 | $Li_4Ti_5O_{12}$ | 3.386 | 83 | 14.9 | 1.570 | 298 |
| Comparative Example 1 | — | — | $Li_4Ti_5O_{12}$ | 3.386 | 0 | 14.5 | 1.563 | 288 |
| Comparative Example 2 | $Li_4Ti_5O_{12}$ | 1.012 | — | — | 100 | 16.4 | 1.562 | 284 |

Figure 4:
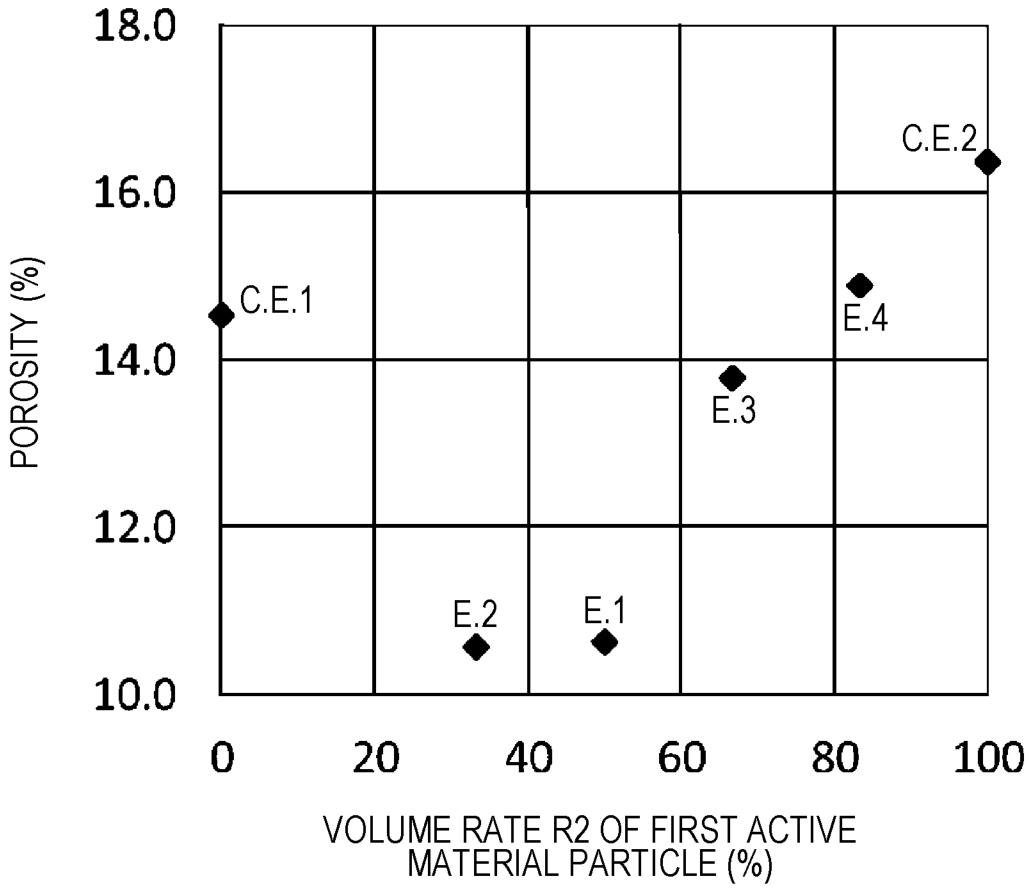
FIG. 4 is a graph showing a relationship between the volume rate of the first active material particle and the porosity of the electrode in Examples and Comparative Examples.
Figure 5:
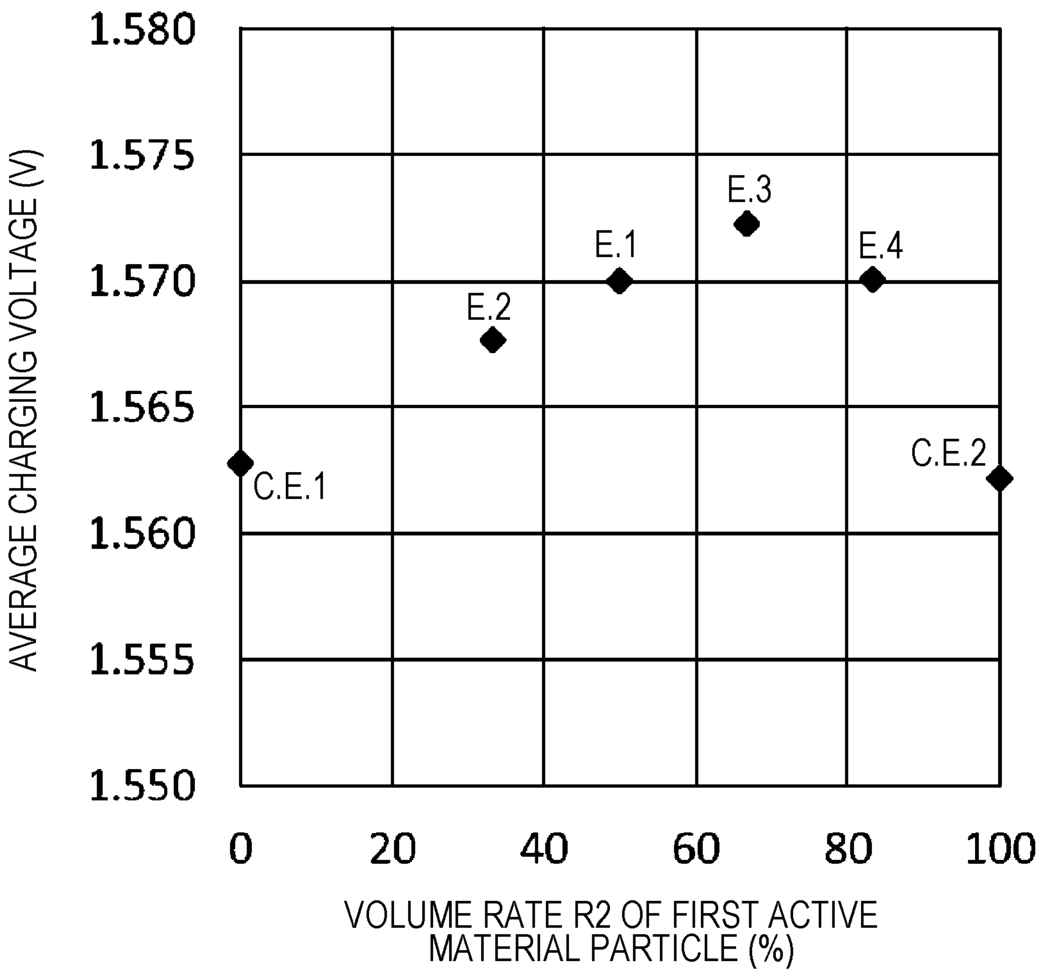
FIG. 5 is a graph showing a relationship between the volume rate of the first active material particle and the average charging voltage of the battery in Examples and Comparative Examples.
Figure 6:
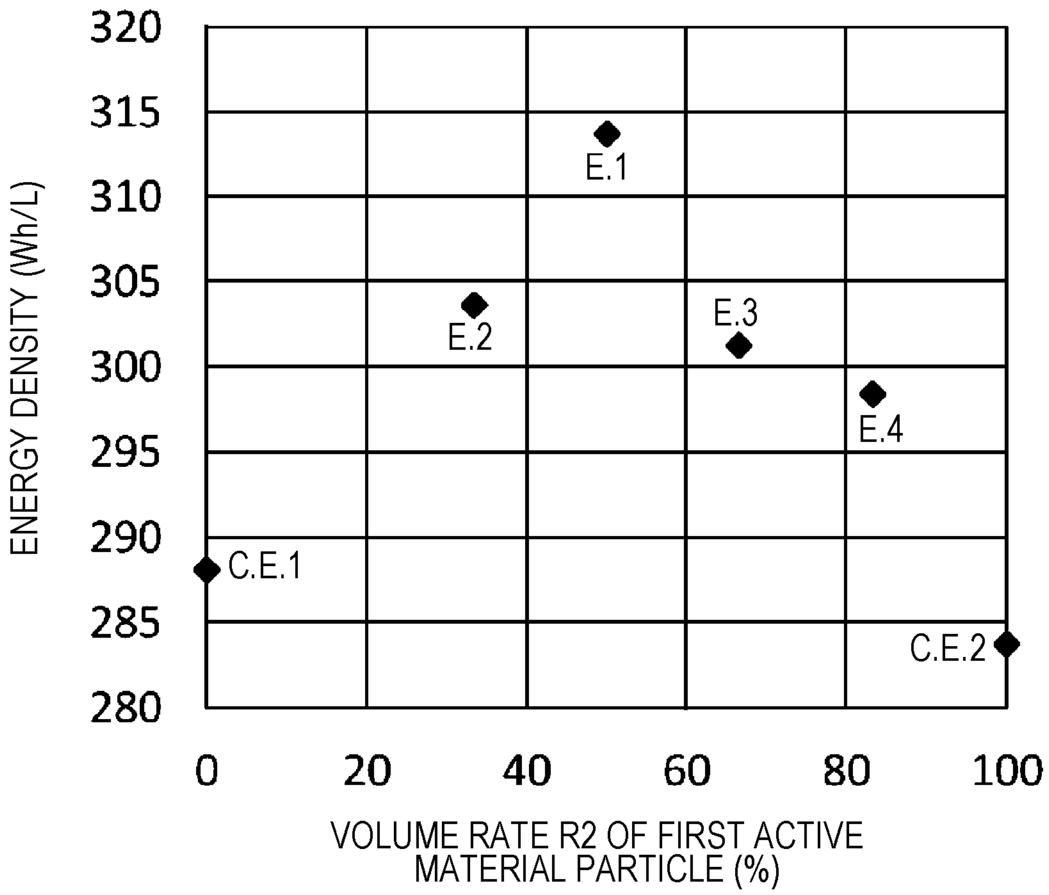
FIG. 6 is a graph showing a relationship between the volume rate of the first active material particle and the energy density of the electrode in Examples and Comparative Examples.

(*1) Rate of the volume of the first active material particle to the total value of the volume of the first active material particle and the volume of the second active material particle Furthermore, regarding Examples and Comparative Examples, relationships between the volume rate R2 of the first active material particle and characteristics of the electrode or battery are shown in FIGS. 4 to 6. FIG. 4 is a graph showing a relationship between the volume rate R2 of the first active material particle and the porosity of the electrode in Examples and Comparative Examples. FIG. 5 is a graph showing a relationship between the volume rate R2 of the first active material particle and the average charging voltage of the battery in Examples and Comparative Examples. FIG. 6 is a graph showing a relationship between the volume rate R2 of the first active material particle and the energy density of the electrode in Examples and Comparative Examples.

Consideration

As obvious from Table 1 and FIGS. 4 to 6, in an electrode made of an electrode material including a first active material particle and a second active material particle in which the ratio R1 of the average particle sizes was greater than or equal to 1.5 and less than or equal to 6.0, the porosity tended to be low. Furthermore, in a battery of Example using this electrode, the average charging voltage tended to be large. In the electrodes used in Examples, the energy density was improved due to the porosity and the average charging voltage.

It is demonstrated from Table 1 and FIG. 6 that when the volume ratio of the first active material particle and the second active material particle is 1:1, the energy density of the electrode is particularly high. It is suggested that this is caused by that the porosity of the electrode is sufficiently low and the average charging voltage of the battery is sufficiently high at the above-mentioned volume ratio. Accordingly, in order to produce an electrode having a high energy density, the first active material particle and the second active material particle may be mixed at a volume ratio of 1:1.

The electrode material of the present disclosure can be used in, for example, an all-solid-state lithium-ion secondary battery. According to the electrode material of the present disclosure, the porosity of the electrode can be reduced while maintaining the solid-phase diffusion of lithium in the active material. According to the electrode material of the present disclosure, it is possible to suppress the increase in resistance that increases with increasing of the thickness of the electrode. In an electrode including the electrode material of the present disclosure, the energy density is improved.

What is claimed is:

1. An electrode material comprising:

a first active material particle;

a second active material particle; and a solid electrolyte, wherein the first active material particle and the second active material particle each include Li, Ti, and O, and a ratio of an average particle size of the second active material particle to an average particle size of the first active material particle is greater than or equal to 1.5 and less than or equal to 6.0.

2. The electrode material according to claim 1, wherein a rate of a volume of the first active material particle to a total value of the volume of the first active material particle and a volume of the second active material particle is greater than or equal to 33% and less than or equal to 83%.

3. The electrode material according to claim 2, wherein the rate is greater than or equal to 34% and less than or equal to 66%.

4. The electrode material according to claim 1, wherein the average particle size of the first active material particle is greater than or equal to 0.5 μm and less than or equal to 1.5 μm, and the average particle size of the second active material particle is greater than 1.5 μm and less than or equal to 4.0 μm.

5. The electrode material according to claim 1, wherein a rate of a total value T2 of a volume of the first active material particle and a volume of the second active material particle to a total value Ti of the volume of the first active material particle, the volume of the second active material particle, and a volume of the solid electrolyte is greater than or equal to 30% and less than or equal to 70%.

6. The electrode material according to claim 1, wherein the first active material particle and the second active material particle each include lithium titanate.

7. The electrode material according to claim 1, wherein the first active material particle and the second active material particle each include $Li_4Ti_5O_{12}$.

8. The electrode material according to claim 1, wherein the solid electrolyte is represented by a following formula (1):

$$Li_\alpha M_\beta X_\gamma \qquad \text{formula (1)}$$

wherein α, β, and γ are each independently a value greater than 0,

M includes at least one selected from the group consisting of metal elements excluding Li and metalloid elements, and X includes at least one selected from the group consisting of F, Cl, Br, and I.

9. The electrode material according to claim 1, wherein the solid electrolyte includes $Li_3YBr_2C_{14}$.

10. A battery comprising:

a positive electrode;

a negative electrode; and an electrolyte layer located between the positive electrode and the negative electrode, wherein at least one selected from the group consisting of the positive electrode and the negative electrode includes the electrode material according to claim 1.

11. The battery according to claim 10, wherein the electrolyte layer includes a solid electrolyte.

* * * * *